United States Patent
Yi et al.

(10) Patent No.: US 12,204,880 B1
(45) Date of Patent: Jan. 21, 2025

(54) INCREMENTAL COMPILING METHOD AND SYSTEM BASED ON HETEROGENEOUS DEVICE

(71) Applicant: ZHEJIANG LAB, Hangzhou (CN)

(72) Inventors: Xiaoyu Yi, Hangzhou (CN); Ji Zhang, Hangzhou (CN); Tao Zou, Hangzhou (CN); Jun Zhu, Hangzhou (CN); Qi Xu, Hangzhou (CN); Fujun Zhang, Hangzhou (CN); Juncheng Ge, Hangzhou (CN); Yongjie Wang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/795,102

(22) Filed: Aug. 5, 2024

Related U.S. Application Data (63) Continuation of application No. PCT/CN2023/123350, filed on Oct. 8, 2023.

(30) Foreign Application Priority Data

Sep. 18, 2023 (CN) .......................... 202311201936.6

(51) Int. Cl.
G06F 8/41 (2018.01)
G06F 8/35 (2018.01)

(52) U.S. Cl.
CPC . G06F 8/42 (2013.01); G06F 8/35 (2013.01)

(58) Field of Classification Search
CPC ..................................... G06F 8/35; G06F 8/42
See application file for complete search history.

(56) References Cited

U.S. PATENT DOCUMENTS

| 11,005,754 | B1 * | 5/2021 | Baldi | .................... H04L 45/56 |
| 2023/0236807 | A1 | 7/2023 | Xue et al. | |
| 2024/0160619 | A1 * | 5/2024 | Sur | .................... G06F 16/2282 |

FOREIGN PATENT DOCUMENTS

| CN | 106533966 A | 3/2017 |
| CN | 107111663 A | 8/2017 |

(Continued)

OTHER PUBLICATIONS

Saquetti et al., "VirtP4: An Architecture for P4 Virtualization" (Year: 2019).*

(Continued)

*Primary Examiner* — Phillip H Nguyen
(74) *Attorney, Agent, or Firm* — W&G Law Group (57) ABSTRACT

An incremental compiling method and an incremental compiling system based on a heterogeneous device. The method comprises: a user using P4 to develop a network program, checking the syntax and semantics of the network program and converting into an intermediate representation; allocating intermediate representation files according to constraints such as the functions and resources of the heterogeneous device; then, transforming the network program into different rule expressions of the heterogeneous device according to the constraints of the heterogeneous device, flow table entries and the like, and loading the on different rule expressions to a target device; when the user needs to deploy network functions incrementally, the user only needs to write new network programs and regenerate rule expressions; by comparing and analyzing the old and new rule expressions, a rule expression that can be loaded on heterogeneous device is formed, and the incremental deployment of network functions is realized.

6 Claims, 5 Drawing Sheets

(56) References Cited

FOREIGN PATENT DOCUMENTS

| CN | 108681590 | A |   | 10/2018 |   |            |
|----|-----------|---|---|---------|---|------------|
| CN | 111343025 | A |   | 6/2020  |   |            |
| CN | 112804152 | A |   | 5/2021  |   |            |
| CN | 114416150 | A |   | 4/2022  |   |            |
| CN | 114885047 | A |   | 8/2022  |   |            |
| CN | 116074208 | A |   | 5/2023  |   |            |
| CN | 116541289 | A |   | 8/2023  |   |            |
| CN | 116610455 | A |   | 8/2023  |   |            |
| CN | 116860323 | A | * | 10/2023 |   |            |
| CN | 116893819 | A | * | 10/2023 |   |            |
| WO | WO-9966680 | A1 | * | 12/1999 | ......... | G06F 9/30021 |
| WO | 2016077393 | A1 |   | 5/2016  |   |            |
| WO | 2023138215 | A1 |   | 7/2023  |   |            |

OTHER PUBLICATIONS

MC Nkosi, "The use of P4 for 5G networks" (Year: 2021).*
Wang et al., "High-speed data-plane packet aggregation and disaggregation by P4 switches" (Year: 2019).*
International Search Report (PCT/CN2023/123350); Date of Mailing: May 22, 2024.
First Office Action(CN202311201936.6); Date of Mailing: Feb. 8, 2024.
Notice Of Allowance(CN202311201936.6); Date of Mailing: Apr. 12, 2024.
Design-and-Implementation-of-the-Operation-Based-on-Ceilometer-Alarm-API.

* cited by examiner

INCREMENTAL COMPILING METHOD AND SYSTEM BASED ON HETEROGENEOUS DEVICE

CROSS-REFERENCE TO RELATED APPLICATIONS

The present application is a continuation of International Application No. PCT/CN2023/123350, filed on Oct. 8, 2023, which claims priority to Chinese Application No. 202311201936.6, filed on Sep. 18, 2023, the contents of both of which are incorporated herein by reference in their entireties.

TECHNICAL FIELD

The present disclosure relates to the technical field of computer networks, and in particular, to an incremental compiling method and an incremental compiling system based on a heterogeneous device.

BACKGROUND

In recent years, the programmability of network data plane has been developed to a certain extent. After users develop network functions, compilers compile programs and send them to programmable devices, thus realizing the corresponding network functions. Network applications are no longer closely coupled with network equipment hardware. When network functions change, users do not need to wait for product iterations of equipment manufacturers for several months. However, the existing implementation methods still have shortcomings. This programmability is static, and after a period of compilation and installation, network functions cannot be added at runtime. However, the added network functions needs to be recompiled and loaded on programmable devices at runtime, which will inevitably cause interruption of the program, and then the seamless upgrade of network applications cannot be realized.

SUMMARY

In view of the shortcomings of the prior art, the object of the present disclosure is to provide an incremental compiling method and an incremental compiling system based on a heterogeneous device.

In order to achieve the above object, the present disclosure provides an incremental compiling method based on a heterogeneous device, which includes the following steps:

(1) Developing, by P4, a network program, checking basic syntax and semantics of the network program, and converting the basic syntax and semantics into intermediate representations.

(2) Modeling function constraints and resource constraints of the heterogeneous device; and allocating the intermediate representations to different heterogeneous device units according to information of the function constraints and the resource constraints of the heterogeneous device. The heterogeneous device units include an Application Specific Integrated Circuit (ASIC) unit and a Field Programmable Gate Array (FPGA) unit.

(3) Generating, by the different heterogeneous device units, different rule expressions for the heterogeneous device according to function mapping conversion rules and flow table information, and loading the rule expressions onto the heterogeneous device.

(4) Developing a network program including a new network functions by P4, and regenerating new rule expressions of the new network functions through the step (1) to the step (3); and comparing and analyzing old rule expressions and the new rule expressions, forming a rule expressions which is capable of being loaded onto the heterogeneous device, and realizing an incremental deployment of network functions.

Further, in the step (2), the ASIC unit and the FPGA unit are connected through a built-in Serdes interface.

Further, the step (2) includes the following sub-steps:

(2.1) Modeling the function constraints and the resource constraints of the heterogeneous device, including modeling the function constraints and resource constraints of the ASIC unit and the FPGA unit in the heterogeneous device.

(2.2) Allocating the intermediate representations to different units of the heterogeneous device based on a priority allocation principle of the ASIC unit according to the information of the function constraints and the resource constraints of the heterogeneous device.

Further, in the sub-step (2.1), modeling the function constraints and resource constraints of the ASIC unit in the heterogeneous device specifically includes:

Constraining adding and deleting functions of the ASIC unit. $T_{aw}$ represents an initial position length of an adding operation offset, $T_{dw}$ represents an initial position length of a deleting operation offset, $T_{AW}$ represents a maximum offset of an adding operation supported by the ASIC unit, $T_{DW}$ represents a maximum offset of a deleting operation supported by the ASIC unit, $T_{as}$ represents a length of an added data segment, $T_{ds}$ represents a length of a deleted data segment, $T_{AS}$ represents a maximum length of the added data segment supported by the ASIC unit, $T_{DS}$ represents a maximum length of the deleted data segment supported by the ASIC unit, $F_{AH}$ represents an operation of adding a data packet header field, $F_{DH}$ represents an operation of deleting a data packet header field, m represents a functional unit placed on heterogeneous device, $x_{m,A} \in \{0,1\}$ represents whether m is placed on the ASIC unit, and a constraint of the adding and deleting function of the ASIC unit is expressed as follows:

$$\bigvee_{T_{aw}>T_{AW}, T_{as}>T_{AS}, T_{dw}>T_{DW}, T_{ds}>T_{DS}, m \in F_{AH}+F_{DH}} x_{m,A} = 0.$$

Constraining a modification function of the ASIC unit. $T_{cw}$ represents an initial position length of an adding operation offset, $T_{CW}$ represents a maximum offset of the modification operation supported by the ASIC unit, $T_{cs}$ represents a length of a modified data segment, $T_{CS}$ represents a maximum length of the modified data segment supported by the ASIC unit, $F_{CH}$ represents an operation of adding a data packet header field, and a constraint of the modification function of the ASIC unit is expressed as follows:

$$\bigvee_{T_{cw}>T_{CW}, T_{cs}>T_{CS}, m \in F_{CH}} x_{m,A} = 0.$$

Modeling User Defined Function (UDF) resources of the ASIC unit. $L_K \in [0,14,34]$ represents offset lengths occupied by the initial positions of different matching offsets; $S_L$ represents a length of a matching offset, $M_L$ represents a length of matching, $I_{LA}$ represents a maximum range of data packet header fields supported by the ASIC unit for matching, $a_{p,A} \in \{0,1\}$ represents whether p is placed on the ASIC unit, $N_{MA}$ represents a maximum matching number supported by the ASIC unit, $\Theta(X)$ is an index function, $M_A$ represents a maximum matching length supported by the ASIC unit, $M_m$ represents a length that a functional unit m actually needs to match, $F_{ET}$ represents an accurate matching table, $F_{LTT}$ represents a ternary matching table, and a matching resource constraint of the ASIC unit is expressed as follows:

$$\bigwedge_{L_K+S_L+M_L \leq I} \sum_{LAm \in F_{ET}+F_{LTT}} \sum_{p \in m} a_{p,A} x_{m,A} \Theta_{(M_m \leq M_A)} \leq N_{MA}.$$

Further, in the sub-step (2.1), modeling the resource constraints and function constraints of the FPGA units in the heterogeneous device specifically includes:

Constraining and modeling for functions of the FPGA unit, and constraining the adding, modifying and deleting functions of the data packet header field for the FPGA unit. $F_{IL}$ represents a length of the added data segment, $F_{CL}$ represents a length of the modified data segment, $F_{DL}$ represents a length of the deleted data segment, $G_{IL}$ represents a maximum length of the added data segment supported by the FPGA unit, $G_{CL}$ represents a maximum length of the modified data segment supported by the FPGA unit, $G_{DL}$ represents a maximum length of the deleted data segment supported by the FPGA unit, and $F_{headerG}$ represents an action supported by the FPGA unit; then the function constraints of the FPGA unit are expressed as follows:

$$\bigvee_{F_{IL}>G_{IL}, F_{CL}>G_{CL}, F_{DL}>G_{DL}, m \in F_{headerG}} x_{m,G} = 0.$$

Constraining and modeling for parsing and matching resources of the FPGA unit. $L_{parser}$ represents a maximum jump length that the FPGA unit is capable of supporting, $S_h$ represents a set of headers deployed in the FPGA unit, $V(h)$ represents the validity of a header field h, $V(h)=1$ represents that the header field is valid, otherwise the header field is invalid, and a constraint of header parsing of the FPGA unit is expressed as follows:

$$\sum_{h \in S_h} V(h) \leq L_{parser}.$$

Constraining and modeling for the matching resources of the FPGA unit. $K_G$ represents a maximum length of matching supported by the FPGA unit, $K_m$ represents an actual matching length of the functional unit m, $N_{MG}$ represents a maximum matching number supported by the FPGA, $a_{p,G} \in \{0,1\}$ represents whether p should be placed on the FPGA unit or not, $x_{m,G} \in \{0,1\}$ represents whether m should be placed on the FPGA unit or not, $M_G$ represents a set of all functional units placed on the FPGA unit, and a constraint of the matching resources of the FPGA unit is expressed as follows:

$$\sum_{m \in M_G} \sum_{p \in m} x_{m,G} a_{p,G} \Theta_{(K_m \leq K_G)} \leq N_{MG}.$$

Further, in the step (3), the function mapping conversion rules are specifically as follows: converting the intermediate representations allocated to different heterogeneous device units into json-format information in combination with corresponding flow tables, and then converting the json-format information into the rule expressions of the heterogeneous device.

Further, the step (4) includes the following sub-steps:

(4.1) Developing the network program including the new network functions by P4, and regenerating the new rule expressions of the new network functions.

(4.2) Comparing and analyzing the rule expressions and the new rule expressions; when rule expressions of the old network functions and the new network functions do not intersect, directly issuing the new rule expressions of the new network functions to the corresponding heterogeneous device units to form a rule expression which is capable of being loaded onto the heterogeneous device, and realizing the incremental deployment of the network functions; when the rule expressions of the old network functions and the new network functions intersect, comparing and analyzing the new rule expressions and old rule expressions, and merging or splitting the corresponding rule expressions to form a rule expression which is capable of being loaded onto the heterogeneous device to realize the incremental deployment of the network functions.

In order to achieve the above object, the present disclosure further provides an incremental compiling system based on a heterogeneous device, including:

A front-end compiling module configured to check basic syntax and semantics of the network program, and convert the basic syntax and semantics into intermediate representations.

A middle-end allocation module configured to allocate the intermediate representations to different heterogeneous device units. The heterogeneous device units include an ASIC unit and an FPGA unit.

A back-end compiling module configured to generate different rule expressions for the heterogeneous device according to function mapping conversion rules and flow table information, and load the rule expressions onto the heterogeneous device.

A rule expression strategy module configured to compare and analyze old rule expressions and new rule expressions to form a rule expression which is capable of being loaded onto the heterogeneous device.

In order to achieve the above object, the present disclosure further provides an electronic device including a memory and a processor. The memory is coupled with the processor. The memory is configured for storing program data, and the processor is configured for executing the program data to implement the above incremental compiling method based on a heterogeneous device.

In order to achieve the above object, the present disclosure further provides a non-transitory computer-readable storage medium on which a computer program is stored. When executed by a processor, the program implements the above incremental compiling method based on a heterogeneous device.

Compared with the prior art, the present disclosure has the beneficial effects as follows: the present disclosure utilizes heterogeneous hardware devices and achieves collaborative operation through modules such as the middle-end allocation module and the rule expression strategy module, addressing the issue in traditional devices where adding new network functions of traditional devices during runtime causes interruptions, enabling hot updates of network functions without affecting existing operations. Compared with the prior art, the present disclosure does not need to recompile all functional programs and load them onto the platform when adding network functions, thereby avoiding interruptions to existing operations. Instead, only the newly added functional programs are compiled and loaded onto t heterogeneous devices, facilitating seamless upgrades of the network functions. Additionally, the present disclosure realizes the cooperative work of heterogeneous units in the heterogeneous devices by reasonably modeling the resource and function constraints of the heterogeneous device, and solves the problem that network developers need to use different programming languages to separately develop network functions for various device architectures. The present disclosure shields network developers from the differences in underlying heterogeneous units, so that network programmers can use a unified P4 network programming language to realize the incremental deployment of network functions on heterogeneous hardware devices without disrupting existing network functionalities, making it more efficient and convenient for developers to use the heterogeneous hardware devices to complete network function development. The implementation method of the present disclosure is straightforward, with low user entry barriers, ensuring significantly improved quality of network service functionalities.

DESCRIPTION OF EMBODIMENTS

The present disclosure will be described in detail with reference to the attached drawings. In the case of no conflict, the features in the following embodiments and implementations can be combined with each other.

Embodiment 1

Figure 1:
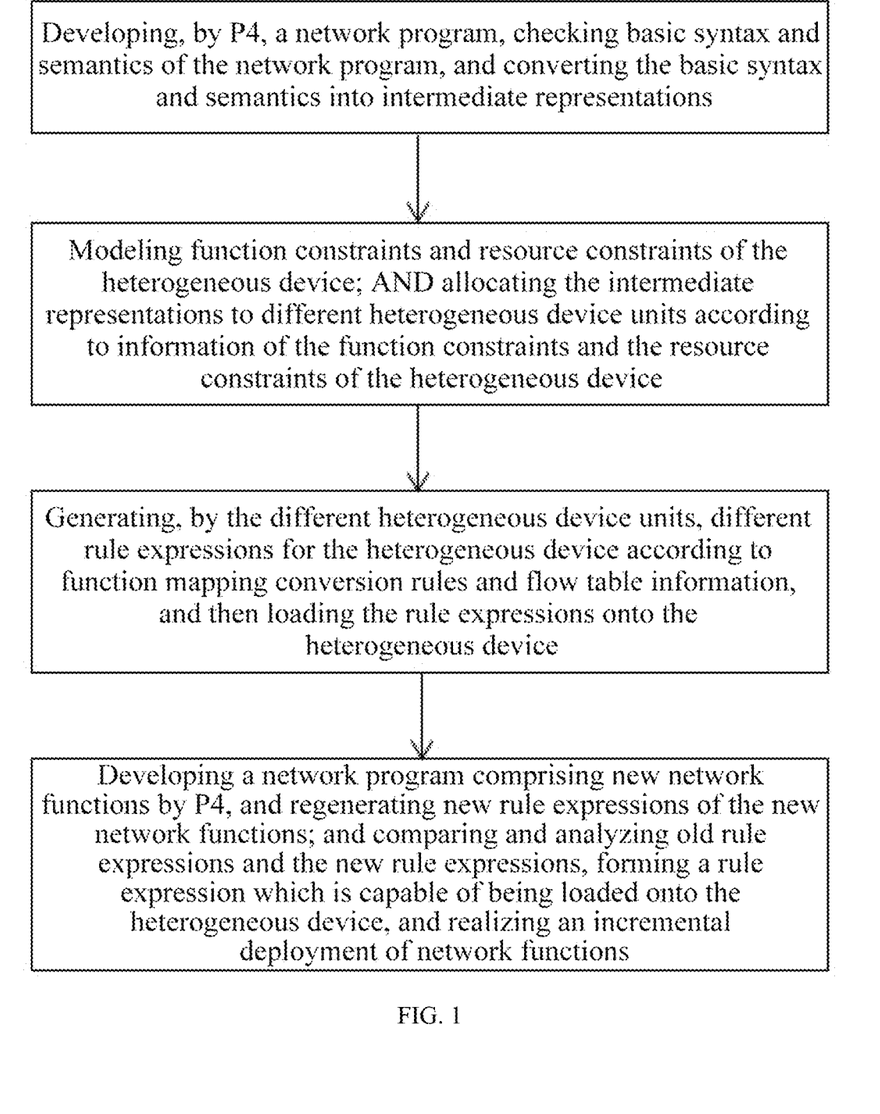
FIG. 1 is a flow chart of the method of the present disclosure.

Referring to FIG. 1, an incremental compiling method based on a heterogeneous device provided by the present disclosure includes the following steps:

Step 1: the user develops a network program through the programming protocol-independent packet processors (P4), and then completes the basic syntax and semantic check of the network program developed by P4 through the front-end compiling module, and converts it into Intermediate Representations (IRs).

Step 2: modeling is carried out for information such as resource constraints and function constraints of the heterogeneous device; the middle-end allocation module allocates the intermediate representations IRs to different heterogeneous device units according to information such as resource constraints and function constraints of the heterogeneous device; the heterogeneous device units here include an ASIC unit and a FPGA unit. The ASIC unit has a programmable parsing function, the FPGA unit has a programmable data packet processing function, and the ASIC unit and FPGA unit are connected through a built-in Serdes interface.

Figure 3:
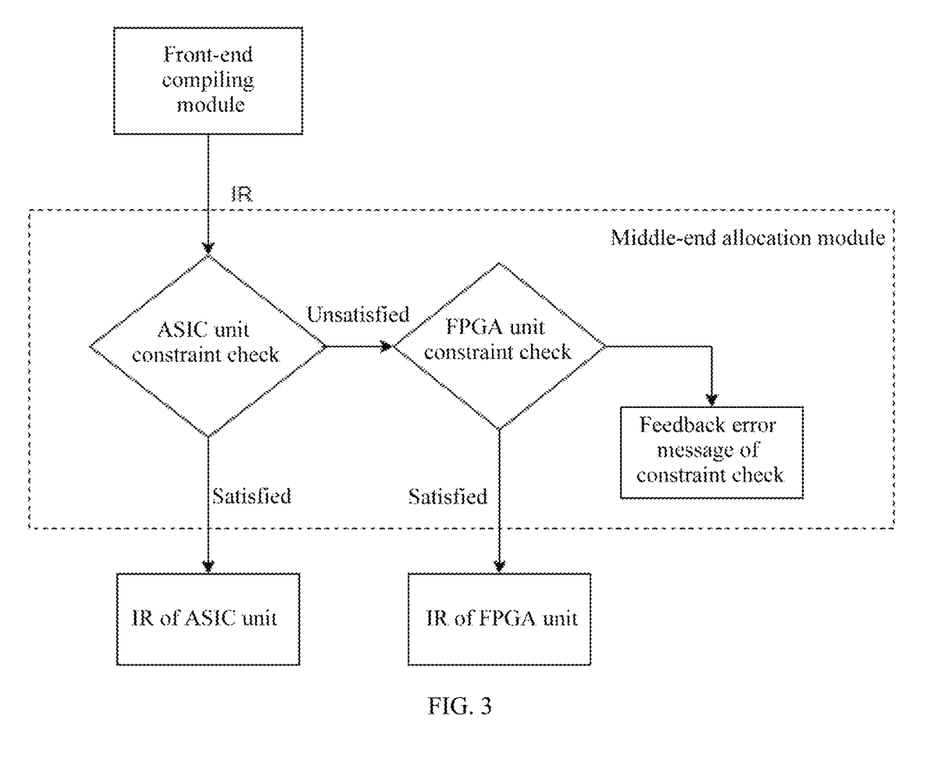
FIG. 3 is a processing flow chart of the middle-end allocation module of the present disclosure.

As shown in FIG. 3, the Step 2 is realized by the following sub-steps:

(2.1) Modeling is performed for the information such as resource constraints and function constraints of the heterogeneous device; the ASIC unit implements the programmable parsing of the data packet through UDF, and the operations of adding, deleting and modifying the data packet header fields through ACL and FlexE; the resource and specific function information in the ASIC unit includes: the type and quantity of UDF, in which the type includes matching offset and matching length range, that is, the position of the data field to be matched in the packet header is determined by the offset initial position and offset length, and the value of the target matching packet field is determined by the matching extraction length and flow table information; ACL functions include redirection, mirroring, multicast and the like, which mainly complete the modification of the packet forwarding path without changing the value of the packet field; programmable editing functions include supporting the addition, modification and deletion of data segments with a specified length at the specified offset position starting from the second, third and fourth headers of the data packet, that is, determining the position of the data field to be modified at the data packet header by specifying the offset initial position and offset length, and determining the target value of the field to be modified by the extracted length and flow table information; the FPGA unit mainly realizes the programmable analysis of the data packet through the combination of LUT, register and RAM, uses LUT to realize integer addition and subtraction, and uses RAM resources to realize the operation of adding, deleting and modifying the data packet header field; at the same time, the FPGA unit also supports the basic operations of the data packet: redirection, multicast, discarding and other functions.

(2.1.1) Modeling is performed on the resource and specific function constraints of the ASIC unit of the heterogeneous device; firstly, constraint modeling is carried out for the functions of the ASIC unit; the functions supported by the ASIC unit include two categories: one is not to change the value of the data packet header fields (redirection, mirroring, multicast); the other is to add, delete and modify the data packet header field, because the former is not limited by resources, and the latter is mainly constrained here; constraints are imposed on the adding and deleting functions of the ASIC unit. $T_{aw}$ represents the initial position length of an adding operation offset, $T_{aw} \in [0,14,34]$ (0 means starting offset from the second-floor header, 14 means starting offset from the third-floor header, and 34 means starting offset from the fourth-floor header), $T_{dw}$ represents the initial position length of an deleting operation offset, $T_{AW}$ represents the maximum offset of the adding operation supported by the ASIC unit, and in this embodiment, $T_{AW}=126B$, B means bytes, $T_{DW}$ represents the maximum offset of a deleting operation supported by the ASIC unit, and in this embodiment, $T_{DW}=126B$, $T_{as}$ represents the length of the added data segment, $T_{ds}$ represents the length of the deleted data segment, $T_{AS}$ represents the maximum length of the added data segment supported by the ASIC unit, in this embodiment, $T_{AS}=48B$, and $T_{DS}$ represents the maximum length of the deleted data segment supported by the ASIC unit, $T_{DS}=48B$, $F_{AH}$ represents the operation of adding the data packet header field, and $F_{DH}$ represents the operation of deleting the data packet header field; m represents the functional unit placed on heterogeneous device, $x_{m,A} \in \{0,1\}$ represents whether m should be placed in the ASIC unit. Then the adding and deleting function constraints of the ASIC unit are expressed as follows:

$$\bigvee_{T_{aw}>T_{AW},T_{as}>T_{AS},T_{dw}>T_{DW},T_{ds}>T_{DS},m \in F_{AH}+F_{DH}} x_{m,A} = 0.$$

Constraints are imposed on the modified function of the ASIC unit, $T_{cw}$ represents the initial position length of the adding operation offset, $T_{cw} \in [0,14,34]$ (0 represents the offset from the second-floor header, 14 represents the offset from the third-floor header and 34 represents the offset from the fourth-floor header), $T_{CW}$ represents the maximum offset of the modification operation supported by that the ASIC unit, in this embodiment, $T_{CW}$=96B, $T_{cs}$ represents the length of the modified data segment, $T_{CS}$ represents the maximum length of the modified data segment supported by the ASIC unit, in this embodiment, $T_{CS}$=16B, and $F_{CH}$ represents the operation of adding the data packet header field, then the modification function constraint of the ASIC unit is expressed as follows.

$$\bigvee_{T_{cw}>T_{CW},T_{cs}>T_{CS},m \in F_{CH}} x_{m,A} = 0.$$

That is, when the length of the data packet field that needs to be added, deleted or modified is greater than the maximum length that can be supported by the ASIC unit, and the offset exceeds the maximum offset that can be supported by the ASIC unit, the functional unit for adding, deleting and modifying the data packet field is 0 on the ASIC unit, that is, the intermediate representation IR corresponding to the functional unit cannot be allocated to the ASIC unit for implementation.

Secondly, the UDF resources of the ASIC unit are modeled, $L_K \in [0,14,34]$ represents the offset length occupied by the initial positions of different matching offsets (0 means offset from the second floor head, 14 means offset from the third floor head, and 34 means offset from the fourth floor head); $S_L$ represents the length of a matching offset, $M_L$ represents the length of matching, and $I_{LA}$ represents the maximum range of packet header fields supported by the ASIC unit for matching, and in this embodiment $I_{LA}$=128B; $a_{p,A} \in \{0,1\}$ represents whether p should be placed on the ASIC unit, where $p \in m$, $x_{m,A} \in \{0,1\}$ represents whether m should be placed on the ASIC unit; $N_{MA}$ represents the maximum matching number that an ASIC unit can support, and in this embodiment $N_{MA}$=112; $\theta(x)$ is an index function, which is equal to 1 when x is satisfied, and equal to 0 when it is not satisfied, $M_A$ represents the maximum matching length that the ASIC unit can support, $M_m$ represents the length of the functional unit m actually to be matched, $F_{ET}$ represents an accurate matching table and $F_{LTT}$ represents a ternary matching table; then the matching resource constraints of the ASIC unit are expressed as follows:

$$\bigwedge_{L_K+S_L+M_L \leq I_{LA}} \sum_{m \in F_{ET}+F_{LTT}} \sum_{p \in m} a_{p,A} x_{m,A} \Theta_{(M_m \leq M_A)} \leq N_{MA}.$$

(2.1.2) Modeling is performed for the resource and function constraints of the FPGA unit in the heterogeneous device. Firstly, constraint modeling is carried out for the functions of the FPGA unit, which, like the ASIC unit, mainly restricts the functions of the FPGA to add, modify and delete the data packet header field; $F_{IL}$ represents a length of the added data segment, $F_{CL}$ represents a length of the modified data segment, $F_{DL}$ represents a length of the deleted data segment, $G_{IL}$ represents a maximum length of the added data segment supported by the FPGA unit, $G_{CL}$ represents a maximum length of the modified data segment supported by the FPGA unit, $G_{DL}$ represents a maximum length of the deleted data segment supported by the FPGA unit, and $F_{headerG}$ represents an action supported by the FPGA unit, $F_{headerG}$ $\{F_{AH}, F_{CH}, F_{DH}\}$, $F_{AH}$ represents the operation of adding a packet header field, $F_{CH}$ represents the operation of adding a packet header field, and $F_{DH}$ represents the operation of deleting a packet header field; then the function constraints of the FPGA unit are expressed as follows:

$$\bigvee_{F_{IL}>G_{IL},F_{CL}>G_{CL},F_{DL}>G_{DL},m \in F_{headerG}} x_{m,G} = 0.$$

Secondly, constraint modeling is carried out for the parsing and matching resources of the FPGA unit. The header parsing process of P4 can be regarded as a jump of state machine. The maximum jump length that FPGA can support is $L_{parser}$, $S_h$ represents a set of headers deployed in the FPGA unit, and V(h) represents the validity of the header field h, V(h)=1 indicating that the header field is valid, otherwise it is invalid. The constraint on header parsing of the FPGA unit is expressed as follows:

$$\sum_{h \in S_h} V(h) \leq L_{parser}.$$

Constrained modeling is carried out for matching resources of the FPGA, $K_G$ represents the maximum length of matching supported by FPGA unit, $K_m$ represents the actual matching length of the functional unit m, $N_{MG}$ represents the maximum matching number supported by FPGA, and $a_{p,G} \in \{0,1\}$ represents whether p should be placed on the FPGA unit, where $p \in m$, m represents a functional unit placed on the heterogeneous device, $x_{m,G} \in \{0,1\}$ represents whether m should be placed on the FPGA unit; $M_G$ represents a set of all functional units placed on FPGA, and the constraint on matching resources of FPGA units is expressed as follows:

$$\sum_{m \in M_G} \sum_{p \in m} x_{m,G} a_{p,G} \Theta_{(K_m \leq K_G)} \leq N_{MG}.$$

(2.2) The middle-end allocation module allocates the intermediate representations IRs to different units of the heterogeneous device based on the priority allocation principle of the ASIC unit according to the information of resource constraints, function constraints and the like of the heterogeneous device; that is, in the case that both ASIC unit and FPGA unit can run functional units, the functional units are preferentially allocated to the ASIC unit.

Figure 4:
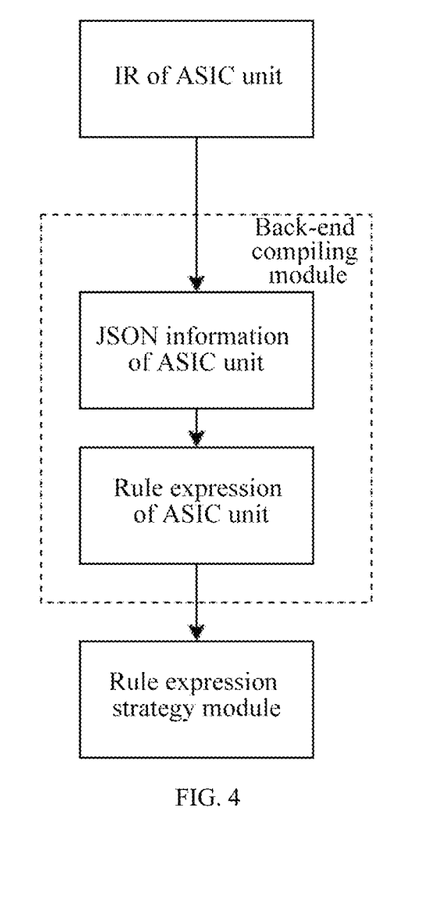
FIG. 4 is a processing flow chart of the ASIC back-end compiling module of the present disclosure.

Step 3: back-end compiling modules of different units of the heterogeneous device generate different rule expressions for the heterogeneous device according to function mapping conversion rules and flow table information, and finally load the rule expressions onto the heterogeneous device to realize the loading of user functions. The function mapping conversion rules are as follows: the back-end compiling module converts the intermediate representations IRs allocated to different units of the heterogeneous device into json-format information in combination with the corresponding stream table information, and then converts them into the rule expressions of the heterogeneous device; as shown in FIG. 4, taking the intermediate representation IR allocated to the ASIC unit by the middle-end allocation module as an example, the code written by the user in P4 language is as follows:

key=hdr.ipv4.dst_addr,action;
    ipv4_set_egress_port(bit<9>                      port)
        {standard_metadata.egress_spec=port;}.

The front-end compiling module will compile the above codes into an intermediate representation IR, the middle-end allocating module will distribute the intermediate IR to the ASIC unit, and the back-end compiler of the ASIC unit will combine the corresponding stream table information to convert it into json-format information; that is, the data packet of p4.IngressPipeImpl.ipv4_exact.add with ipv4_set_egress_port(dst_addr=0x0A000003,port=3) with the matching destination IP address of 10.0.0.3 is forwarded from a port 3 and converted into json-format information, specifically:

```
"ipv4_exact": {
    "action": {
        "ipv4_set_egress_port":{
            "redirect": {
                "priority": 9,
                "value": "3"
            }
        }
    },
    "key":
        "dst_addr":
            "user_offset": 240,
            "length": 32,
            "priority": 7,
            "start": "L2",
            "value": "0x0A000003"
        },
        "etherType": {
            "user_offset": 96,
            "length": 16,
            "priority": 7,
            "start": "L2",
            "value": "0x0800"
        }
    }
}
``` where user_offset in key: dst_addr refers to the length of a matching offset, i.e., $S_L$=240 bits, length refers to the length of matching, i.e.m $M_L$=32 bits, start=L2 means $L_K$=0; $S_L$=96 bits, $M_L$=16 bits, $L_K$=0 in key: etherType; both keys satisfy the UDF resource constraint on the ASIC unit in sub-step (2.2); action is redirection, that is, it is mapped to a keyword redirect, which satisfies the function constraints on the ASIC unit in sub-step (2.2); rule 1 udf base L2 offset 96 match 0x0800 mask ffff interface 1, where rule 1 represents Rule 1, and the matching of UDF is shifted by 12 bytes from L2, and because the mask is ffff, it means that the 0x00800 field is exactly matched, that is, etherType=0x0800, and the rule is bound to port 1, so as to realize programmable parsing and identification of IPv4 packets; the packet with the destination IP address of 10.0.0.3 is redirected to the port 3, and converted into the specific function expression of ASIC as: rule 2 udf base L2 offset 240 match 0a000003 mask ffffffff action redirect interface 3, where rule 2 represents Rule 2, the matching of UDF is shifted from L2 by 240 bits to be matched with a packet with the destination IP address of 0a000003, that is, 10.0.0.3, and is redirected and forwarded to the port 3.

Step 4: if it needs to add new network functions, users only need to write new network programs, and then regenerate the rule expression of new network functions through the front-end compiling module, the middle-end allocation module and the back-end compiling module. The rule expression strategy module will compare and analyze the old and new rule expressions, and combine the capabilities of the heterogeneous device to form rule expressions that can be loaded onto the heterogeneous device to realize incremental deployment of network functions.

The Step 4 is implemented by the following sub-steps:
(4.1) If new network functions are to be added, users only need to write new programs, and then generate rule expressions of new network functions through the front-end compiling module, middle-end allocation module and back-end compiling module.
(4.2) The rule expression strategy module will compare and analyze the new and old rule expressions. There may be two situations here: in the first case, if the rule expressions of the old and new network functions do not intersect, the rule expression strategy module will directly send the rule expressions of the new network functions to the corresponding heterogeneous device units to realize the incremental deployment of network functions; in the second case, if the rule expressions of the old and new network functions intersect, the rule expression strategy module will compare and analyze the old and new rule expressions, and merge or split the corresponding rule expressions to realize the coexistence of the old and new network functions and complete the incremental deployment of the network.

Embodiment 2

In a multi-modal network, it is necessary to realize the dynamic increase of network modals. When the network starts to run the identity network modal, the unicast forwarding of identity packets is realized. After that, according to the service requirements, unicast forwarding of IPv4 modals needs to be added, and the incremental compiling method based on a heterogeneous device provided by the present disclosure realizes the dynamic and uninterrupted addition of network modals.

Step 1: the user develops an identity network data plane function program through P4, which mainly completes network addressing according to the identity, namely Globally Unique Identifier (GUID=101). The front-end compiling module completes the basic syntax and semantic check and converts the basic syntax and semantics into IR.

Step 2: the middle-end allocation module will allocate according to the resource constraints and specific function constraints of the ASIC unit and FPGA unit, and because the identity network data plane function program mainly completes the functions of parsing the identity data packet, redirecting the identity data packet after matching the GUID and the like, the middle-end allocation module will allocate IR to the ASIC according to the priority allocation principle of the ASIC unit under the condition of satisfying the constraints of the ASIC unit.

Step 3: the back-end compiling module of the ASIC unit will generate rule expressions for ASIC according to the function mapping conversion rules and flow table information of the ASIC unit, and two-level UDF matching can be realized on the ASIC unit. Firstly, the type of the data packet is determined, that is, rule 1 udf base L2 offset 96 match 0x27c0 mask ffff interface 2, where rule 1 represents Rule 1, and the matching of UDF is shifted from L2 by 96 bits, that is, to the etherType field. Because the mask is ffff, it represents the exact matching of 0x27c0, and the rule is bound to a port 2, so as to realize the programmable parsing and identification of the identity data packet; secondly, the specific data packet is processed according to json information, and the identity data packet with GUID=101 is subjected to network addressing, that is, the data packet is redirected to port 3, and is converted into the specific function expression of ASIC as: rule 2 udf base L2 offset 178 match 0x00000065 mask ffffffff action redirect interface 3, where rule 2 represents Rule 2, and the matching of UDF is shifted from L2 by 178 bits to be accurately matched with the field 0x00000065, that is, 101, and redirect interface 3 means to redirect the packet with GUID=101 to the port 3.

Step 4: when the user needs to add a new network mode, that is, to add a new parsing process to the IPV4 data packet, the user only needs to write an IPv4 data plane program in P4 language, and then complete the basic syntax and semantic check through the front-end compiling module, and convert it into IR; when writing the operation on the IPv4 data packet, the TTL field of IPv4 is reduced by 1, which is beyond the specific function constraints of ASIC, that is, ASIC cannot add and subtract integers, therefore the middle-end allocation module converts IR into a rule expression of the FPGA unit. The above two rule expressions are aimed at different subunits, and there is no intersection. Therefore, the newly added rule expression for IPv4 parsing and processing function can be directly loaded into the FPGA unit to realize the incremental deployment of network functions.

Embodiment 3

Corresponding to the aforementioned embodiment of the incremental compiling method based on a heterogeneous device, the present disclosure also provides an embodiment of the incremental compiling system based on a heterogeneous device.

Figure 2:
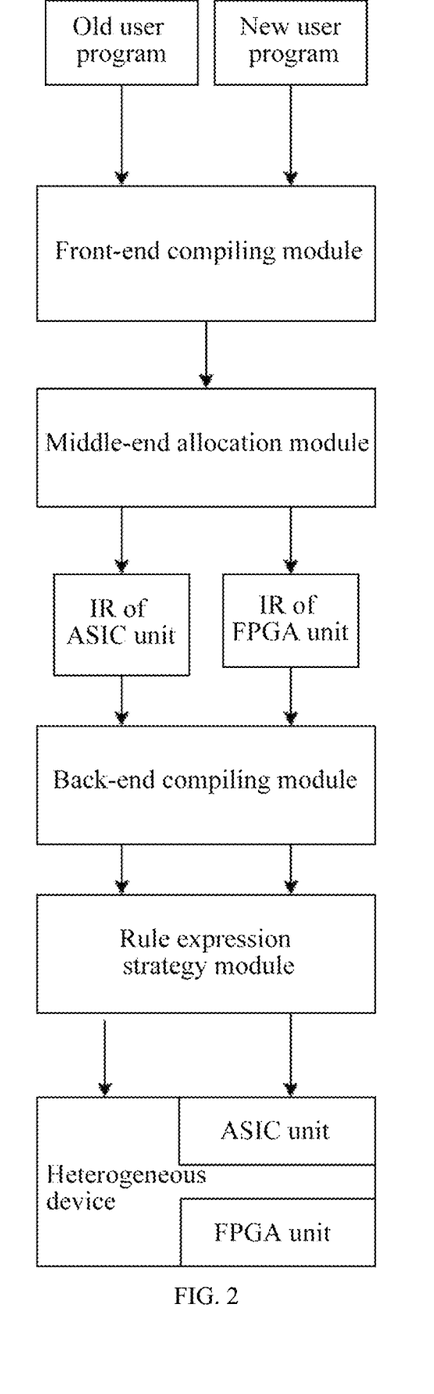
FIG. 2 is a flow chart of the system of the present disclosure.

Referring to FIG. 2, the system may include:

A front-end compiling module configured to check basic syntax and semantics of the network program, and convert the basic syntax and semantics into intermediate representations.

A middle-end allocation module configured to allocate the intermediate representations to different heterogeneous device units. The heterogeneous device units include an ASIC unit and a FPGA unit.

A back-end compiling module configured to generate different rule expressions for the heterogeneous device according to function mapping conversion rules and flow table information, and then load the rule expressions onto the heterogeneous device.

A rule expression strategy module configured to compare and analyze old rule expressions and new rule expressions to form a rule expression which is capable of being loaded onto the heterogeneous device.

With regard to the system in the above embodiment, the specific way in which each module performs operations has been described in detail in the embodiment of the method, and will not be described in detail here.

Embodiment 4

Figure 5:
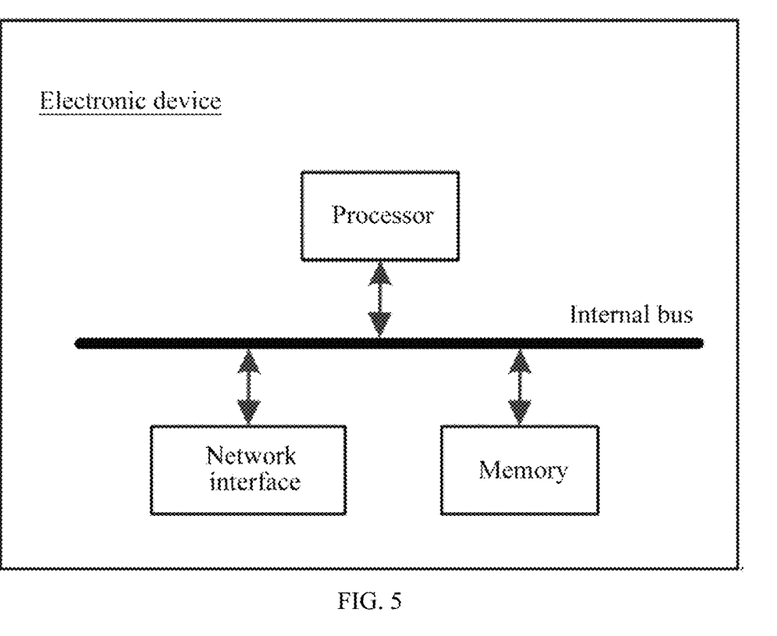
FIG. 5 is a schematic diagram of an electronic device.

Corresponding to the aforementioned embodiment of the incremental compiling method based on a heterogeneous device, the embodiment of the present disclosure also provides an electronic device, which includes one or more processors; a memory for storing one or more programs; when the one or more programs are executed by the one or more processors, the one or more processors implement the incremental compiling method based on a heterogeneous device as described above. As shown in FIG. 5, it is a hardware structure diagram of any device with data processing capability where the incremental compilation method based on a heterogeneous device provided by the embodiment of this application is located. In addition to the processor, memory, DMA controller, disk and nonvolatile memory shown in FIG. 5, any device with data processing capability where the system is located in the embodiment usually includes other hardware according to the actual function of the device with data processing capability, which will not be described here again.

Embodiment 5

Corresponding to the aforementioned embodiment of the incremental compiling method based on a heterogeneous device, the embodiment of the present disclosure also provides a non-transitory computer-readable storage medium on which a program is stored, which, when executed by a processor, implements the incremental compiling method based on a heterogeneous device in the above embodiment.

The non-transitory computer-readable storage medium can be an internal storage unit of any device with data processing capability as described in any of the previous embodiments, such as a hard disk or a memory. The non-transitory computer-readable storage medium can also be any device with data processing capability, such as a plug-in hard disk, a Smart Media Card (SMC), an SD card, a Flash Card and the like. Further, the non-transitory computer-readable storage medium can also include both internal storage units and external storage devices of any device with data processing capability. The non-transitory computer-readable storage medium is used for storing the computer program and other programs and data required by any device with data processing capability, and can also be used for temporarily storing data that has been output or will be output.

The above is only the preferred embodiments of the present disclosure, and they are intended to limit the present disclosure. Any modification, equivalent substitution, improvement and the like made within the spirit and principle of the present disclosure should be included in the scope of protection of the present disclosure.

The above embodiments are only used to illustrate the design ideas and characteristics of the present disclosure, and their purpose is to enable those skilled in the art to understand the contents of the present disclosure and implement it accordingly. The protection scope of the present disclosure is not limited to the above embodiments. Therefore, all equivalent changes or modifications made according to the principles and design ideas disclosed in the present disclosure are within the protection scope of the present disclosure.

What is claimed is:

1. An incremental compiling method based on a heterogeneous device, comprising:
step (1) developing, by P4, a network program, checking basic syntax and semantics of the network program, and converting the basic syntax and semantics into intermediate representations;

step (2) modeling function constraints and resource constraints of the heterogeneous device; and allocating the intermediate representations to different heterogeneous device units according to information of the function constraints and the resource constraints of the heterogeneous device, The heterogeneous device units comprise an Application Specific Integrated Circuit (ASIC) unit and a Field Programmable Gate Array (FPGA) unit;

sub-step (2.1) modeling the function constraints and the resource constraints of the heterogeneous device, comprising: modeling the function constraints and the resource constraints of the ASIC unit and the FPGA unit in the heterogeneous device;

modeling the function constraints and the resource constraints of the ASIC unit in the heterogeneous device further comprises:

constraining adding and deleting functions of the ASIC unit, wherein $T_{aw}$ represents an initial position length of an adding operation offset, $T_{dw}$ represents an initial position length of a deleting operation offset, $T_{AW}$ represents a maximum offset of an adding operation supported by the ASIC unit, $T_{DW}$ represents a maximum offset of a deleting operation supported by the ASIC unit, $T_{as}$ represents a length of an added data segment, $T_{ds}$ represents a length of a deleted data segment, $T_{AS}$ represents a maximum length of the added data segment supported by the ASIC unit, $T_{DS}$ represents a maximum length of the deleted data segment supported by the ASIC unit, $F_{AH}$ represents an operation of adding a data packet header field, $F_{DH}$ represents an operation of deleting a data packet header field, m represents a functional unit placed on the heterogeneous device, $x_{m,A} \in \{0,1\}$ represents whether m is placed on the ASIC unit, and a constraint of the adding and deleting function of the ASIC unit is expressed as follows:

$$\bigvee_{T_{aw}>T_{AW}, T_{as}>T_{AS}, T_{dw}>T_{DW}, T_{ds}>T_{DS}, m \in F_{AH}+F_{DH}} x_{m,A} = 0,$$

constraining a modification function of the ASIC unit, wherein $T_{cw}$ represents an initial position length of an adding operation offset, $T_{CW}$ represents a maximum offset of the modification operation supported by the ASIC unit, $T_{cs}$ represents a length of a modified data segment, $T_{CS}$ represents a maximum length of the modified data segment supported by the ASIC unit, $F_{CH}$ represents an operation of adding a data packet header field, and a constraint of the modification function of the ASIC unit is expressed as follows:

$$\bigvee_{T_{cw}>T_{CW}, T_{cs}>T_{CS}, m \in F_{CH}} x_{m,A} = 0,$$

modeling User Defined Function (UDF) resources of the ASIC unit, wherein $L_K \in [0,14,34]$ represents offset lengths occupied by the initial positions of different matching offsets; $S_L$ represents a length of a matching offset, $M_L$ represents a length of matching, $I_{LA}$ represents a maximum range of data packet header fields supported by the ASIC unit for matching, $a_{p,A} \in \{0,1\}$ represents whether p is placed on the ASIC unit, $N_{MA}$ represents a maximum matching number supported by the ASIC unit, $\theta(x)$ is an index function, $M_A$ represents a maximum matching length supported by the ASIC unit, $M_m$ represents a length that a functional unit m actually needs to match, $F_{ET}$ represents an accurate matching table, $F_{LTT}$ represents a ternary matching table, and a matching resource constraint of the ASIC unit is expressed as follows:

$$\bigwedge_{L_K+S_L+M_L \leq I_{LA}} \sum_{m \in F_{ET}+F_{LTT}} \sum_{p \in m} a_{p,A} x_{m,A} \Theta_{(M_m \leq M_A)} \leq N_{MA},$$

modeling the resource constraints and the function constraints of the FPGA units in the heterogeneous device further comprises:

constraining and modeling for functions of the FPGA unit, and constraining adding, modifying and deleting functions of a data packet header field for the FPGA unit, wherein $F_{IL}$ represents a length of an added data segment, $F_{CL}$ represents a length of a modified data segment, $F_{DL}$ represents a length of a deleted data segment, $G_{IL}$ represents a maximum length of the added data segment supported by the FPGA unit, $G_{CL}$ represents a maximum length of the modified data segment supported by the FPGA unit, $G_{DL}$ represents a maximum length of the deleted data segment supported by the FPGA unit, and $F_{headerG}$ represents an action supported by the FPGA unit, and a function constraint of the FPGA unit is expressed as follows:

$$\bigvee_{F_{IL}>G_{IL}, F_{CL}>G_{CL}, F_{DL}>G_{DL}, m \in F_{headerG}} x_{m,G} = 0,$$

constraining and modeling for parsing and matching resources of the FPGA unit, wherein $L_{parser}$ represents a maximum jump length that the FPGA unit is capable of supporting, $S_h$ represents a set of headers deployed in the FPGA unit, V(h) represents validity of a header field h, V(h)=1 represents that the header field is valid, otherwise the header field is invalid, and a constraint of header parsing of the FPGA unit is expressed as follows:

$$\sum_{h \in S_h} V(h) \leq L_{parser},$$

constraining and modeling for the matching resources of the FPGA unit, wherein $K_G$ represents a maximum length of matching supported by the FPGA unit, $K_m$ represents an actual matching length of the functional unit m, $N_{MG}$ represents a maximum matching number supported by the FPGA, $a_{p,G} \in \{0,1\}$ represents whether p is placed on the FPGA unit or not, $x_{m,G} \in \{0,1\}$ represents whether m is placed on the FPGA unit or not, $M_G$ represents a set of all functional units placed on the FPGA unit, and a constraint of the matching resources of the FPGA unit is expressed as follows:

$$\sum_{m \in M_G} \sum_{p \in m} x_{m,G} a_{p,G} \Theta_{(K_m \leq K_G)} \leq N_{MG},$$

sub-step (2.2) allocating the intermediate representations to different units of the heterogeneous device based on a priority allocation principle of the ASIC unit according to the information of the function constraints and the resource constraints of the heterogeneous device;

step (3) generating, by the different heterogeneous device units, different rule expressions for the heterogeneous device according to function mapping conversion rules and flow table information, and loading the rule expressions onto the heterogeneous device; and step (4) developing a network program comprising new network functions by P4, and regenerating new rule expressions of the new network functions through the steps (1) to (3); and comparing and analyzing old rule expressions and the new rule expressions, forming a rule expression capable of being loaded onto the heterogeneous device, and realizing an incremental deployment of network functions, so as to avoid interruptions to existing operations.

2. The incremental compiling method based on the heterogeneous device according to claim 1, wherein in the step (2), the ASIC unit and the FPGA unit are connected through a built-in Serdes interface.

3. The incremental compiling method based on the heterogeneous device according to claim 1, wherein in the step (3), the function mapping conversion rules comprise: converting the intermediate representations allocated to different heterogeneous device units into json-format information in combination with corresponding flow tables, and converting the json-format information into the rule expressions of the heterogeneous device.

4. The incremental compiling method based on the heterogeneous device according to claim 1, wherein the step (4) further comprises:

sub-step (4.1) developing the network program comprising the new network functions by P4, and regenerating the new rule expressions of the new network functions; and sub-step (4.2) comparing and analyzing the rule expressions and the new rule expressions; when rule expressions of the old network functions and the new network functions do not intersect, directly issuing the new rule expressions of the new network functions to the corresponding heterogeneous device units to form the rule expression capable of being loaded onto the heterogeneous device, and realizing the incremental deployment of the network functions; when the rule expressions of the old network functions and the new network functions intersect, comparing and analyzing the new rule expressions and old rule expressions, and merging or splitting the corresponding rule expressions to form the rule expression capable of being loaded onto the heterogeneous device to realize the incremental deployment of the network functions.

5. An incremental compiling system based on a heterogeneous device for implementing the method according to claim 1, comprising:

a front-end compiling module configured to check basic syntax and semantics of the network program, and convert the basic syntax and semantics into intermediate representations;

a middle-end allocation module configured to allocate the intermediate representations to different heterogeneous device units, wherein the heterogeneous device units comprise an ASIC unit and a FPGA unit;

a back-end compiling module configured to generate different rule expressions for the heterogeneous device according to function mapping conversion rules and flow table information, and load the rule expressions onto the heterogeneous device; and a rule expression strategy module configured to compare and analyze old rule expressions and new rule expressions to form a rule expression which is capable of being loaded onto the heterogeneous device.

6. A non-transitory computer-readable storage medium on which a computer program is stored, wherein the program, when executed by a processor, is configured to implement the incremental compiling method based on the heterogenous device according to claim 1.

\* \* \* \* \*